United States Patent
Maguire et al.

(10) Patent No.: US 7,147,431 B2
(45) Date of Patent: Dec. 12, 2006

(54) COOLED TURBINE ASSEMBLY

(75) Inventors: Alan R Maguire, Derby (GB); Paul W Ferra, Derby (GB)

(73) Assignee: Rolls-Royce plc, London (GB)

( * ) Notice: Subject to any disclaimer, the term of this patent is extended or adjusted under 35 U.S.C. 154(b) by 416 days.

(21) Appl. No.: 10/713,101

(22) Filed: Nov. 17, 2003

(65) Prior Publication Data
US 2004/0101400 A1    May 27, 2004

(30) Foreign Application Priority Data
Nov. 27, 2002  (GB)  ................................. 0227640.0

(51) Int. Cl.
*F01D 9/04* (2006.01)
*F01D 9/06* (2006.01)
*F01D 25/12* (2006.01)

(52) U.S. Cl. .................... 415/115; 415/116; 415/168.2; 415/168.4; 415/173.1

(58) Field of Classification Search ........ 415/115–116, 415/168.2, 168.4, 173.1, 173.2, 173.3; 416/95, 416/96 R, 96 A, 97 R
See application file for complete search history.

(56) References Cited

U.S. PATENT DOCUMENTS

| 4,573,865 A | * | 3/1986 | Hsia et al. ................. 415/115 |
| 4,804,310 A | * | 2/1989 | Fuller et al. ................. 415/115 |
| 5,649,806 A | * | 7/1997 | Scricca et al. .............. 415/115 |
| 6,840,737 B1 | * | 1/2005 | Flatman ...................... 415/116 |

FOREIGN PATENT DOCUMENTS

| EP | 0515130 A | | 5/1991 | |
| EP | 0974734 A | | 1/2000 | |
| GB | 806815 P | | 12/1958 | |
| GB | 938247 A | * | 10/1963 | .................. 415/115 |
| GB | 1119774 A | * | 7/1968 | .................. 415/116 |
| GB | 2016606 A | | 9/1979 | |
| GB | 2310255 A | | 8/1997 | |
| GB | 1484288 A | * | 9/1997 | .............. 415/173.1 |
| JP | 62-153504 A | * | 7/1987 | .............. 415/173.1 |

* cited by examiner

Primary Examiner—Christopher Verdier
(74) Attorney, Agent, or Firm—W. Warren Taltavull; Manelli Denison & Selter PLLC

(57) ABSTRACT

A gas turbine engine (10) is provided with a stage of turbine blades (22) surrounded by hollow shroud segments (28). Cooling of the shroud segments (28) is achieved by providing a flow of engine leakage air from space volume (48) centrally of the engine (10) via an annular compartment (46) wherein it is diverted away from the blade cooling system and passed via piping (44) within each guide vane (20) to shroud segments (28). The flow impingement cools the shroud segments (28) and then passes into the gas annulus via slots (60).

9 Claims, 1 Drawing Sheet

COOLED TURBINE ASSEMBLY

FIELD OF THE INVENTION

The present invention relates to a cooled turbine assembly for use in a gas turbine engine. The invention has particular efficacy when used in a gas turbine engine for the purpose of powering an aircraft.

BACKGROUND OF THE INVENTION

It is known to provide air from a compressor of an associated gas turbine engine, for the purpose of cooling the engine turbine structure, i.e. at least the respective first high pressure high temperature stage of nozzle guide vanes, and/or the immediately following high pressure high temperature stage of turbine blades. Cooling is achieved by passing air bled from the compressor into passageways formed in the aerofoils of the respective vanes and blades, then ejecting the air into the gas annulus via slots in the trailing edges of the aerofoils.

Some turbine designs incorporate a stage of turbine blades which lie in a gas annulus wherein that part of which surrounding the stage of blades is constructed from a number of segments known as shroud segments. The known method of cooling such a structure is to provide a flow of compressor air over the radially outer surface of the segments, the flow path being defined between those radially outer surfaces and a surrounding casing.

SUMMARY OF THE INVENTION

The present invention seeks to provide an improved cooled turbine structure.

According to the present invention a cooled turbine structure comprises adjacent stages of guide vanes and turbine blades, leaked air gathered in a central spaced volume in a gas turbine engine when operatively associated therewith, wherein said turbine blades are surrounded in spaced relationship by hollow shroud segments that are connected via respective upstream ends to said guide vanes, the passage of said leaked air from said central space volume to said hollow shroud segment interiors being enabled by pipe members extending through said guide vanes which connect said space volume and said hollow shroud segment interiors in flow series and wherein said shroud segments include a leaked air exit aperture in their respective downstream edges.

BRIEF DESCRIPTION OF THE DRAWINGS

The invention will now be described by way of example and with reference to the accompanying drawings, in which.

DETAILED DESCRIPTION OF THE INVENTION

Figure 1:
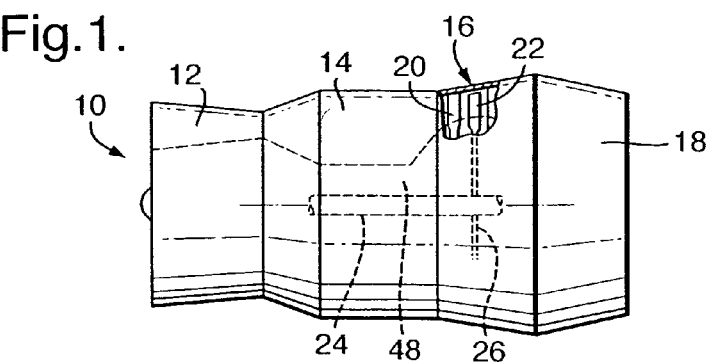
FIG. 1 is a diagrammatic view of a gas turbine engine of the kind appropriate for the inclusion therein of a cooled turbine structure in accordance with the present invention.

Referring to FIG. 1 a gas turbine engine 10 includes a compressor 12, combustion equipment 14, a turbine structure 16, and an exhaust duct 18. The turbine structure 16, has a stage of guide vanes 20, immediately followed by a stage of turbine blades 22, the latter being connected to a rotary shaft 24, via a rotor disk 26.

Figure 2:
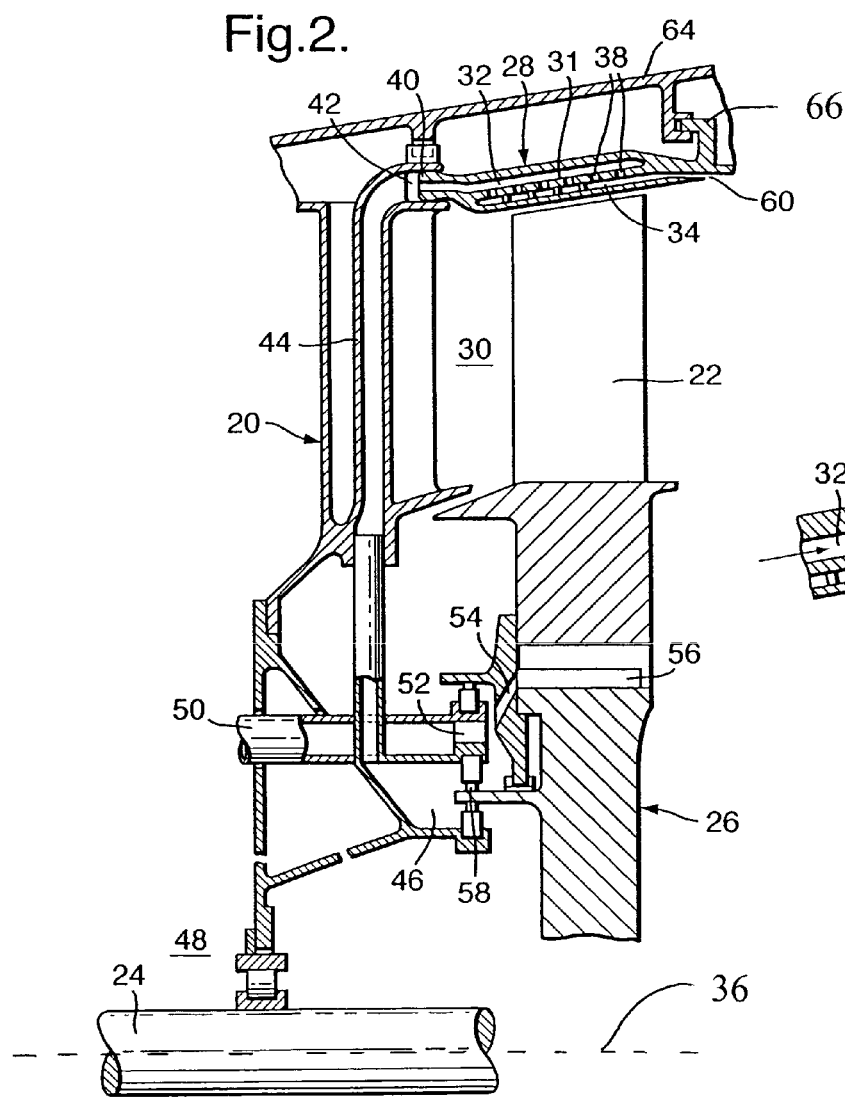
FIG. 2 is an enlarged cross sectional view of cooled turbine structure in accordance with the present invention.

Referring to FIG. 2 the stage of turbine blades 22 is surrounded in radially spaced relationship by a ring of shroud segments 28, which together make up the outer wall of that part of the gas annulus 30 within which blade stage 22 rotates.

Figure 3:
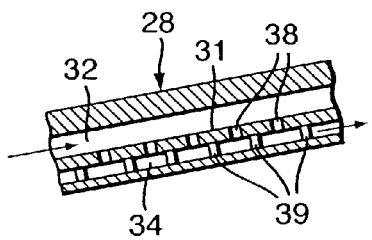
FIG. 3 is an enlarged part view of the shroud segment of FIG. 2.

Each shroud segment 28 is hollow and in the present example its interior is divided by a wall 31 into outer and inner compartments 32 and 34 with respect to the axis 36 of the shaft 24. Compartments 32 and 34 are connected in flow series by a plurality of small holes 38 in their dividing wall 31 and wall 31 is spaced from the innermost wall by support pillars 39, all of which is best seen in FIG. 3.

Referring back to FIG. 2 the leading edge 40 of each shroud segment 28 locates in a slot 42 that expands laterally of the axis of a respective tube 44 at its outer end, one of which tubes resides within each guide vane 20. The radially inner end of each tube 44 projects into a common annular compartment 46, which is provided for the receipt of contaminated air that during operation of the engine 10 leaks through various seal structures (not shown) within the general engine structure and collects in the space volume 48 between the combustion equipment 14 and shaft 24 (FIG. 1).

During the said operation of engine 10 air deliberately bled from compressor 12 is passed through pipes 50, only one of which is shown, and which terminate in swirl vanes 52. The majority of the bled air on exiting the swirl vanes 52, flows through passageways 54 and 56 into the interior of the aerofoil of each turbine blade 22 so as to cool them in known manner. The remainder of the bled air leaks through seal 58 to augment the contaminated air in compartment 46. The mixed flow then passes through tubes 44 into the outer compartments 32 in respective shroud segments 28 and thence via holes 38 into the inner compartments 34 to impingement cool the shroud segments 28 inner walls. The mixed flow then passes around pillars 39 which generates turbulence in the flow, thus increasing cooling efficiency and finally exits the shroud segments 28 via slots 60 in their trailing edges into the gas annulus.

During engine operation the gas flow passes across the exit slots 60 and generates a pressure drop in that region. This phenomenon boosts the mixed flow rate through pipes 44 and so ensures efficient cooling of the shroud segments 28. Moreover use of leaked air as the main cooling medium for that purpose, obviates the need to provide a further dedicated compressor bleed supply thus enabling more efficient engine operation.

If a slam acceleration is needed during operation of engine 10 the resulting surge of fuel into the combustion equipment 14 effects a rapid rise in gas temperature which is felt throughout the turbine system. Turbine blade stage 22 rotates at a greater speed which increases the centrifugal force thereon causing the turbine blades to creep, i.e. to extend their lengths. However, guide vanes 20 react to the increased heat by extending even faster thus pivoting shroud segments 28 radially outwards of the engine axis 36 about their downstream ends. To facilitate the pivoting movement the air inlet ends 40 of shroud segments 28 are curved so as to provide point contact only with slots 42. By these means collision between the tips of blades 22 and shroud segments 28 is avoided.

The pivoting capability of the shroud segments 28 as described immediately hereinbefore also enables the adoption of another feature namely the cooling of the casing 64 that surrounds the shroud segments 28 and supports their downstream ends 66. If casing 64 is cooled in the vicinity of the shroud segments 28 at least during normal running of engine 10 shroud segments 28 will be maintained close to the tips of blades 22 thus avoiding excessive clearances and subsequent loss in performance.

Shroud segments 28 have been described hereinbefore as having divided interiors to define compartments 32 and 34. However they could have only one compartment (not shown). In such an arrangement it would be beneficial to retain the pillars 39 so as to maintain strength and turbulence propagation.

We claim:

1. A cooled turbine structure comprising hollow shroud segments, at least one seal allowing air leakage, pipe members adjacent stages of guide vanes and turbine blades wherein said turbine blades are surrounded in spaced relationship by said hollow shroud segments that are connected via respective upstream ends to said guide vanes, said seal allowing air leakage through said seal to a central space volume wherein said air leakage is provided to cool said shroud segments, the passage of said air leakage from said central space volume to said hollow shroud segment interiors being enabled by said pipe members which extend through said guide vanes which connect said space volume and said hollow shroud segment interiors in flow series and wherein said shroud segments include air leakage exit apertures in their respective downstream edges.

2. A cooled turbine structure as claimed in claim 1 wherein each hollow shroud segment interior includes a dividing wall so as to provide radially inner and outer compartments with respect to an axis of rotation of a gas turbine engine.

3. A cooled turbine structure as claimed in claim 2 wherein said dividing wall has multiple perforations therein so as to enable air leakage to flow from one compartment to the other compartment.

4. A cooled turbine structure as claimed in claim 3 wherein the direction of flow from one compartment to the other compartment is radially inward with respect to the axis of rotation of the gas turbine engine.

5. A cooled turbine structure as claimed in claim 4 wherein said air leakage exit apertures connect said radially inward compartment with the gas annulus of the gas turbine engine.

6. A cooled turbine structure as claimed in claim 2 wherein each said dividing wall is spaced from its associated inner wall by pillars.

7. A cooled turbine structure comprising hollow shroud segments, pipe members adjacent stages of guide vanes and turbine blades wherein said turbine blades are surrounded in spaced relationship by said hollow shroud segments that are connected via respective upstream ends to said guide vanes, leaked air from a central spaced volume in a gas turbine engine, the passage of said leaked air from said central space volume to said hollow shroud segment interiors being enabled by said pipe members which extend through said guide vanes which connect said space volume and said hollow shroud segment interiors in flow series and wherein said shroud segments include leaked air exit apertures in their respective downstream edges wherein the leaked air inlet end of each shroud segment is shaped so as to engage said pipe members by point contact only.

8. A cooled turbine structure as claimed in claim 7 wherein the shroud segments are pivotal such that on extension of their respective guide vanes if exposed to excessive heat, said extension pivots said shroud segments away from the tips of their adjacent turbine blades.

9. A gas turbine engine including a cooled turbine structure as claimed in claim 1.

* * * * *